USOO5743591A

United States Patent [19]
Tame

[11] Patent Number: 5,743,591
[45] Date of Patent: Apr. 28, 1998

[54] VEHICLE SEAT HAVING HYDRAULIC ACTUATOR

[75] Inventor: Omar D. Tame, W. Bloomfield, Mich.

[73] Assignee: Atoma International, Inc., Markham, Canada

[21] Appl. No.: 726,350

[22] Filed: Oct. 4, 1996

[51] Int. Cl.$^6$ .................................................. B60N 2/42
[52] U.S. Cl. ............................ 297/216.1; 297/362.13; 297/344.1
[58] Field of Search ..................... 297/216.1, 337, 297/344.1, 344.18, 344.19, 362.13, 362.12, 216.16, 216.18, 216.13

[56] References Cited

U.S. PATENT DOCUMENTS

| | | |
|---|---|---|
| 2,880,815 | 4/1959 | Apfelbaum . |
| 2,998,281 | 8/1961 | Stover et al. ............... 297/216.1 X |
| 3,024,067 | 3/1962 | Brandoli . |
| 3,366,416 | 1/1968 | Tabor ......................... 297/316.1 X |
| 3,533,658 | 10/1970 | Gropp et al. . |
| 3,683,957 | 8/1972 | Sands . |
| 3,761,127 | 9/1973 | Giese et al. ................ 297/216.1 X |
| 4,090,580 | 5/1978 | McLennan ................. 297/216.1 X |
| 5,320,308 | 6/1994 | Bilezikjian et al. ........ 297/216.1 X |
| 5,454,622 | 10/1995 | Demopoulos ............... 297/216.1 X |

FOREIGN PATENT DOCUMENTS

| | | |
|---|---|---|
| 1 512 599 | 1/1968 | France . |
| 2 376 772 | 8/1978 | France . |
| 24 15 769 | 10/1975 | Germany . |

OTHER PUBLICATIONS

Patent Abstracts of Japan, vol. 95, No. 6, JP 7-069114, Mar. 1995.
Patent Abstracts of Japan, vol. 15, No. 457 (M-1181) JP 3-19536, Aug. 1991.
Patent Abstracts of Japan, vol. 95, No. 6, JP 07-061273, Mar. 1995.
"Manual Recliner with Dynamic Interlock", Resarch Disclosure, No. 375, Jul. 1995, p. 474.

*Primary Examiner*—Milton Nelson Jr.
*Attorney, Agent, or Firm*—Cushman, Darby & Cushman; IP Group of Pillsbury; Madison & Sutro LLP

[57] ABSTRACT

A vehicle seat includes a seat cushion assembly for supporting an occupant seated thereon and a seat back cushion assembly for supporting the back of an occupant seated on the seat cushion assembly. A first mounting assembly is constructed and arranged to mount the seat cushion assembly on a vehicle floor and a second mounting assembly is provided which is constructed and arranged to mount the seat back cushion assembly on the seat cushion assembly. An adjusting mechanism is operatively embodied in one of the first and second mounting assemblies and is constructed and arranged to enable the cushion assembly mounted by the one mounting assembly to be moved in opposite directions through a range of adjustable positions with respect to the assembly on which the one mounting assembly mounts the cushion assembly. The adjusting mechanism also includes a locking and releasing device. A vehicle crash sensing system is operatively connected with the adjusting mechanism and is constructed and arranged to provide control of the movement of the cushion assembly mounted by the one mounting assembly in response to the sensing of a crash condition which occurs while said locking device is in the releasing position.

13 Claims, 5 Drawing Sheets

VEHICLE SEAT HAVING HYDRAULIC ACTUATOR

BACKGROUND OF THE INVENTION

This invention relates to vehicle seats, and more particularly, to a vehicle seat having a hydraulic actuator for adjusting a movable portion of the seat.

Adjusting movement of a vehicle seat back assembly or of the vehicle seat cushion assembly can be controlled with hydraulic actuators as disclosed, for example, in U.S. Pat. No. 3,024,067 and German Patent Application DT 2415769. These non-powered actuators comprise a cylinder and a piston which slides in the cylinder and can be acted on with pressure fluid on both sides thereof. A piston rod associated with the piston is coupled to the seat component to be adjusted. A valve is provided which is opened manually as needed for adjustment. The valve is disposed in a conduit which connects two working chambers of the cylinder. The chambers are separated by the piston. Upon opening the valve, the working chambers are permitted to communicate via the connecting line and the piston can be displaced. If the actuator is used to move or recline a seat back assembly, once the valve is opened, typically, a spring biases the seat back assembly to an upright position. Thereafter, the passenger may recline the seat back assembly to any adjustable position within the range of movements of the actuator upon pressing his back on the seat back assembly or by moving the seat back assembly by hand. Once the desired position is located, the valve is closed preventing communication between the two chambers, thus locking the seat back assembly in the desired position.

The actuator may also be employed to permit movement of the seat cushion assembly fore and aft by coupling the piston rod to a movable portion of the seat cushion assembly and coupling the cylinder to a fixed portion of the seat cushion assembly.

When conventional hydraulic actuators are so employed, generally the vehicle owner's manual instructs the operator to avoid adjusting the seat components while the vehicle is operating. However, vehicle passengers tend not to heed these warnings and will adjust the vehicle seat while the vehicle is in motion. This may create a dangerous situation since, if the vehicle seat is being adjusted during vehicle operation and an accident occurs either in the forward or rearward portion of the vehicle, injury to the passenger may occur as a result of the impact force being transferred to the vehicle seat.

Accordingly, need exists to provide a non-powered adjustable vehicle seat having a system which controls movement of the adjustable portion of the seat in response to the sensing of a vehicle crash condition which occurs while a primary locking device is in a released position.

SUMMARY OF THE INVENTION

An object of the present invention is to fulfill the need referred to above.

In accordance with the principles of the present invention, this objective is obtained by providing a vehicle seat including a seat cushion assembly constructed and arranged to support an occupant seated thereon and a seat back cushion assembly constructed and arranged to support the back of an occupant seated on the seat cushion assembly. A first mounting assembly is constructed and arranged to mount the seat cushion assembly on a vehicle floor and a second mounting assembly is provided which is constructed and arranged to mount the seat back cushion assembly on the seat cushion assembly.

An adjusting mechanism is operatively embodied in one of the first and second mounting assemblies and is constructed and arranged to enable the cushion assembly mounted by the one mounting assembly to be moved in opposite directions through a range of adjustable positions with respect to the assembly on which the one mounting assembly mounts the cushion assembly. The adjusting mechanism includes a locking and releasing device constructed and arranged to be moved between (1) a locking position wherein the locking and releasing device is operable to lock the adjusting mechanism to prevent movement in either direction of the cushion assembly enabled to be moved thereby and (2) a releasing position wherein the locking and releasing device is operable to release the adjusting mechanism to permit the cushion assembly enabled to be moved thereby to be manually moved in relatively unrestricted fashion in one direction and returned in relatively unrestricted fashion in the opposite direction.

A vehicle crash sensing system is operatively connected with the adjusting mechanism and is constructed and arranged to provide control of the movement of the cushion assembly mounted by the one mounting assembly in response to the sensing of a crash condition which occurs while the locking device is in the releasing position.

Other objects, features and characteristics of the present invention, as well as the function of the related elements of the structure, and the combination of the parts and economies of manufacture, will become apparent upon consideration of the following detailed description and the appended claims with reference to the accompanying drawings, all of which form a part of this specification.

DETAILED DESCRIPTION OF THE PRESENTLY PREFERRED EXEMPLARY EMBODIMENTS

Figure 1:
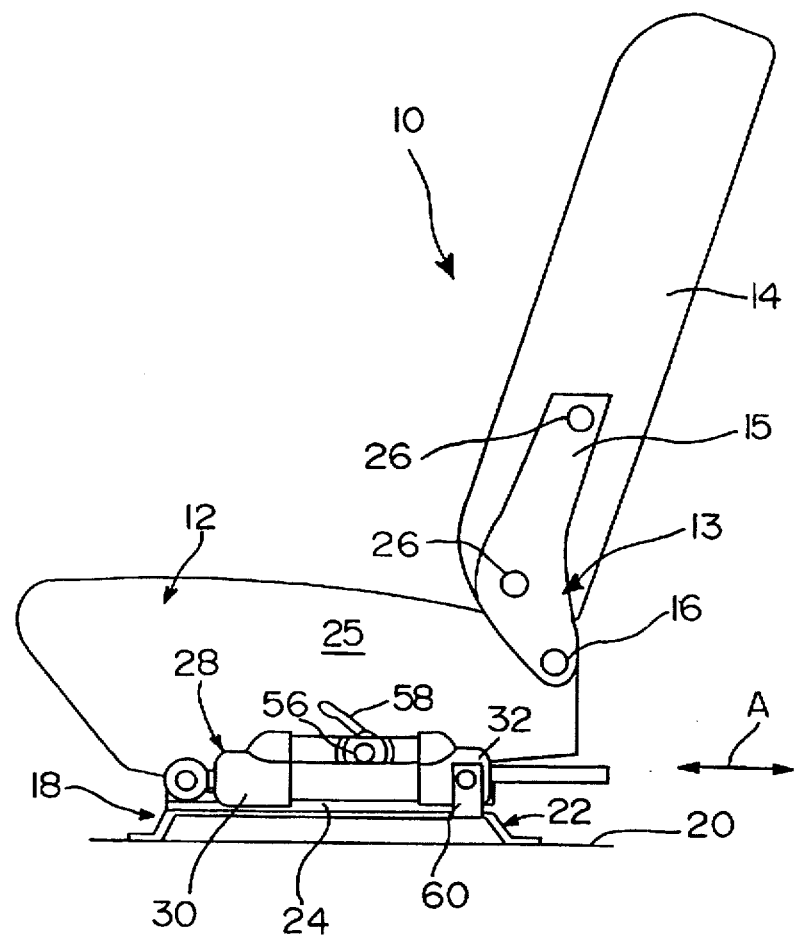
FIG. 1 is a side view of a vehicle seat mounted on the floor of the vehicle including an adjusting mechanism for adjusting the seat cushion assembly, provided in accordance with the principles of the present invention.
Figure 2:
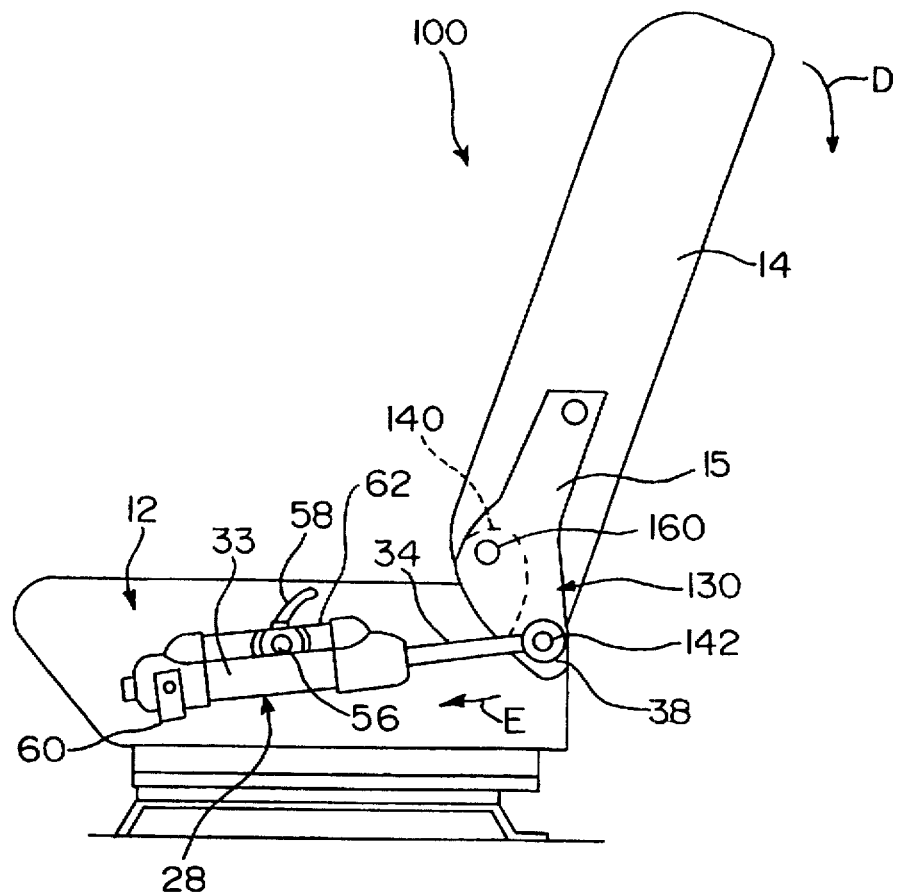
FIG. 2 is a side view of a vehicle seat mounted on the floor of the vehicle including an adjusting mechanism for adjusting the seat back cushion assembly, provided in accordance with the principles of the present invention.

Referring now to the drawings, vehicle seats are shown, generally indicated at 10 in FIG. 1 and at 100 in FIG. 2, which embody the principles of the present invention.

As shown in FIG. 1, the vehicle seat 10 includes a seat cushion assembly 12 constructed and arranged to support an occupant seated thereon. A seat back cushion assembly 14 for supporting the back of an occupant seated on the seat cushion assembly 12 is pivotally coupled to the seat cushion assembly 12 at pivot 16. A first mounting assembly, generally indicated at 18, is constructed and arranged to mount the seat cushion assembly 12 on a vehicle floor assembly 20. In the illustrated embodiment, the first mounting assembly 18 includes a first frame portion 22 which is fixed to the floor assembly 20. The first mounting assembly 18 also includes a movable portion in the form of a vehicle seat pan 24. The seat pan 24 is mounted in a conventional manner with respect to the fixed frame portion 22 so as to be movable in the directions of arrow A of FIG. 1. A seat cushion 25 is carried by the seat pan 24.

A second mounting assembly, generally indicated at 13, is constructed and arranged to mount the seat back cushion assembly 14 on the seat cushion assembly 12. As shown in FIG. 1, the second mounting assembly includes at least one bracket 15 fixed to the seat back cushion assembly 14 at connections 26 and pivotally coupled to the seat cushion assembly 12 at pivot 16. The seat back cushion assembly 14 may moved about pivot 16 to a reclined position and may also be capable of being folded forwardly for easy entry into a rear passenger compartment of the vehicle.

Figure 3:
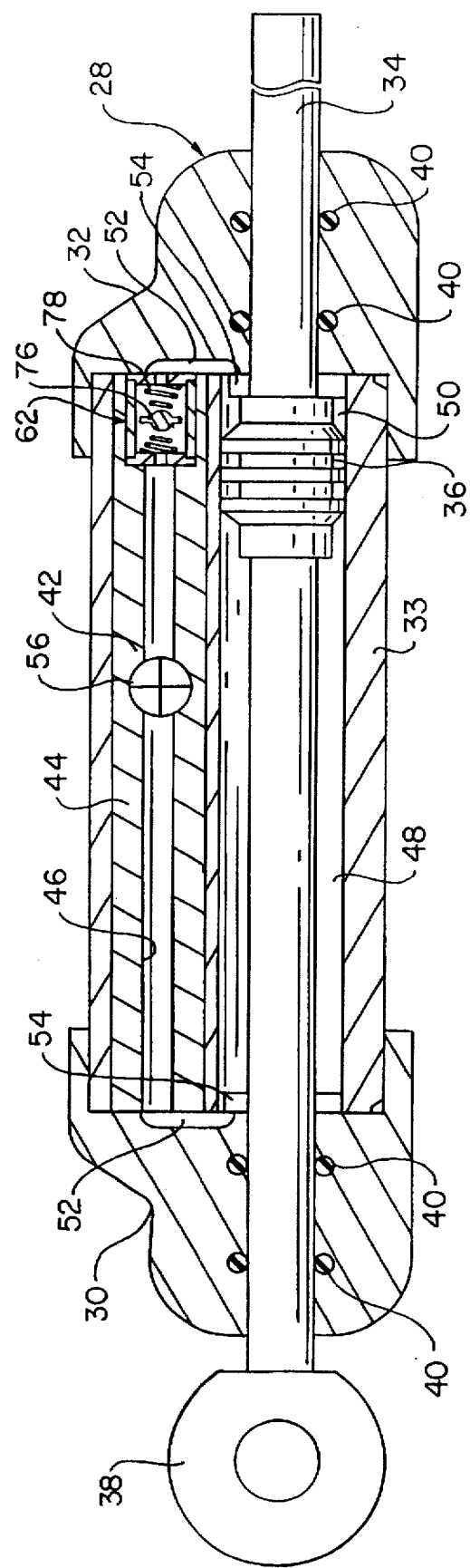
FIG. 3 is a cross-sectional view of an adjusting mechanism and vehicle crash sensing system provided in accordance with the invention.

The vehicle seat 10 includes an adjusting mechanism, generally indicated at 28, which in the illustrated embodiment of FIG. 1 is embodied in the first mounting assembly 18. The adjusting mechanism 28 is constructed and arranged to enable the seat cushion assembly 12 mounted on the first mounting assembly 18 to be moved in opposite directions within a range of adjustable positions with respect to the fixed frame portion 22. As shown in FIG. 3, the adjusting mechanism 28 includes first and second end caps, 30 and 32, respectively, coupled to a housing or cylinder 33 at opposite ends thereof. A piston rod 34 is disposed in the cylinder 33 and extends through the end caps 30 and 32. Since the rod 34 extends through both the end caps 30 and 32, there is no need to employ other volume compensating devices which are required in cylinders having a rod extending through only one end thereof. The rod 34 carries a piston 36 sealingly slidable in the cylinder 33. An end of the rod 34 includes an eyelet 38 for coupling the adjusting mechanism 28 to the seat pan 24 of the vehicle seat 10. O-ring seals 40 are provided to prevent fluid from exiting the end caps 30 and 32. An incompressible fluid such as oil fills the cylinder 33.

The adjusting mechanism 28 includes a locking and release device, generally indicated at 42. As shown in FIG. 3, the locking and release device 42 includes a housing 44 sealingly coupled between the end caps 30 and 32 defining a conduit 46. Two chambers 48 and 50 are defined on opposite sides of the piston 36 and are interconnected by the conduit 46 via passage 52 in each end cap and passage 54 in cylinder 33.

The locking and release device includes a valve 56 disposed within the conduit 46 which is manually operable or opened and closed by means of an operating lever 58 (FIG. 1). When the valve 56 is opened, there is free fluid communication between the first and second chambers 48 and 50, and when the valve 56 is closed, there is no fluid communication between the chambers 48 and 50. When the valve 56 is in the closed position, the hydraulic fluid is prevented from flowing from one chamber to the other in the cylinder 33, thereby hydraulically locking the piston 36 and thus, the movable portion 24 of the seat cushion assembly 12 with respect to the fixed portion 22 thereof.

As shown in FIG. 1, the eyelet 38 of the rod 34 is connected to the seat pan 24 or movable portion of the seat cushion assembly 12 while the end cap 30 is mounted to the fixed frame portion 22 via bracket 60. In order to adjust the fore and aft position of the seat cushion assembly 12 with respect to the vehicle floor assembly 20 or fixed frame portion 22, the valve 56 is opened by operating the lever 58.

Fluid can then freely flow from one chamber to the other chamber in the cylinder 33 whereby the piston 36 connected with the movable portion 24 of the seat cushion assembly 12 can be displaced by acting on the seat cushion assembly 12. It can be appreciated that the seat cushion assembly 12 can be manually moved fore and aft in a relatively unrestricted fashion when the valve 56 is opened. Once the desired adjustment has been made, the valve 56 is closed by moving the lever 58 and the seat cushion assembly 12 is hydraulically locked in the desired position.

Adjustments of the seat cushion assembly 12 should always be made while the vehicle is not operating. However, it has been determined that many drivers or passengers adjust their seat while the vehicle is operating. However, if the valve 56 is opened to adjust the seat cushion assembly 12 during a crash condition, the force of the impact may be transferred to the vehicle seat which may cause injury to the seat occupant.

In accordance with the invention, a vehicle crash sensing system, generally indicated at 62, is provided which is operatively connected with the adjusting mechanism 28. The vehicle crash sensing system 62 is constructed and arranged to provide control of the movement of the seat cushion assembly 12 in response to the sensing of a crash condition which occurs when the locking and release device 42 is in its releasing position.

With reference to FIG. 3, the vehicle crash sensing system 62 is shown mounted within the conduit 46. In the illustrated embodiment, the system 62 includes a housing 64 defining an interior space 66. The housing has bores 68 and 70 through opposing sidewalls thereof. The bores communicate the conduit 46 with the interior space 66. The housing 64 includes sealing surfaces 72 and 74 adjacent the bores 68 and 70, respectively. A valve member 76, of generally ball-shaped, is mounted by spring structure in a normally inoperative position within the interior space 66. In the illustrated embodiment, the spring structure includes a pair of springs 78 and 80 coupled to opposing ends of a flange 81 of the valve member 76.

Figure 4:
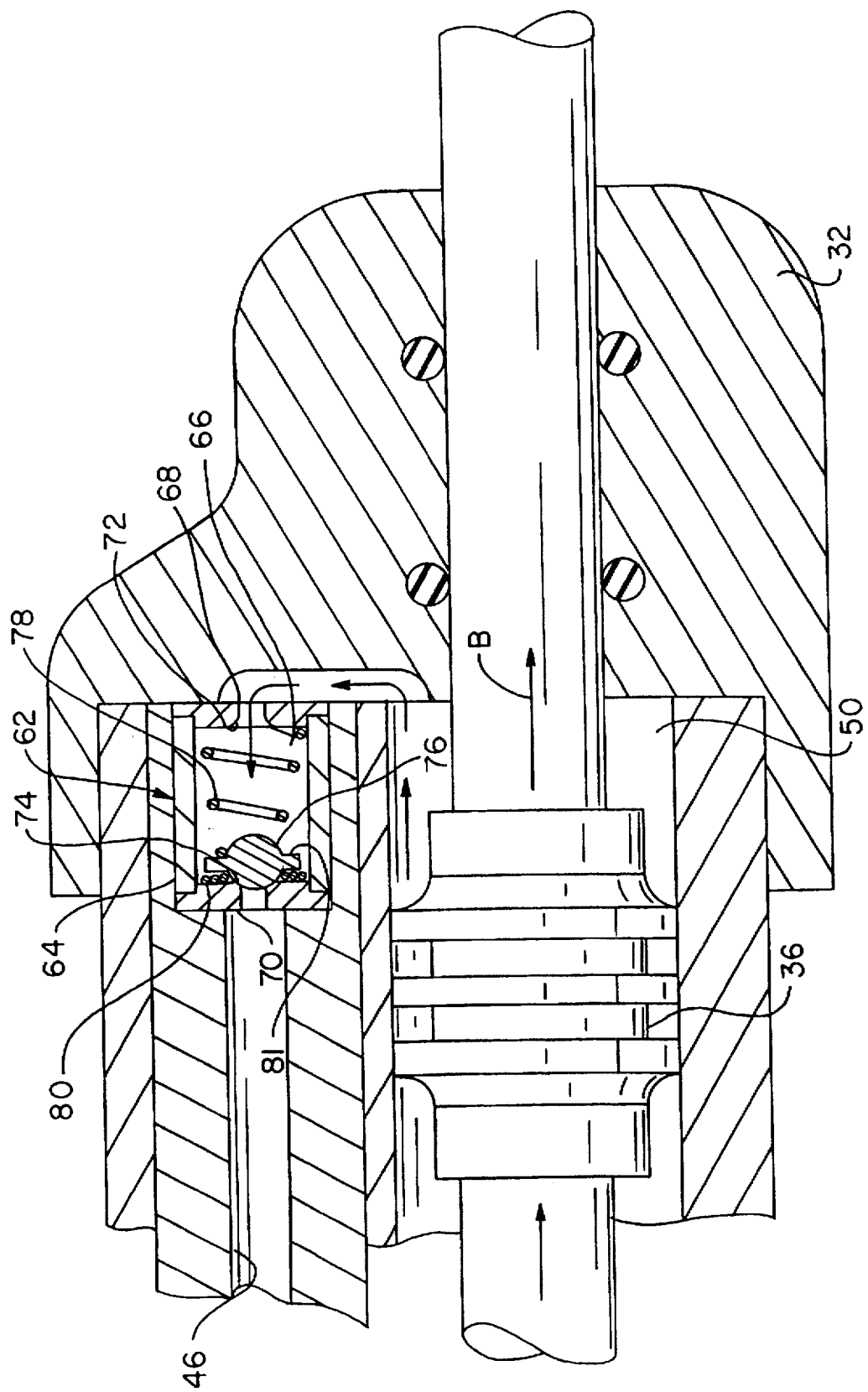
FIG. 4 is an enlarged cross-sectional view of the crash sensing system of FIG. 3 shown with a valve of the system in a closed position preventing communication between piston chambers.
Figure 5:
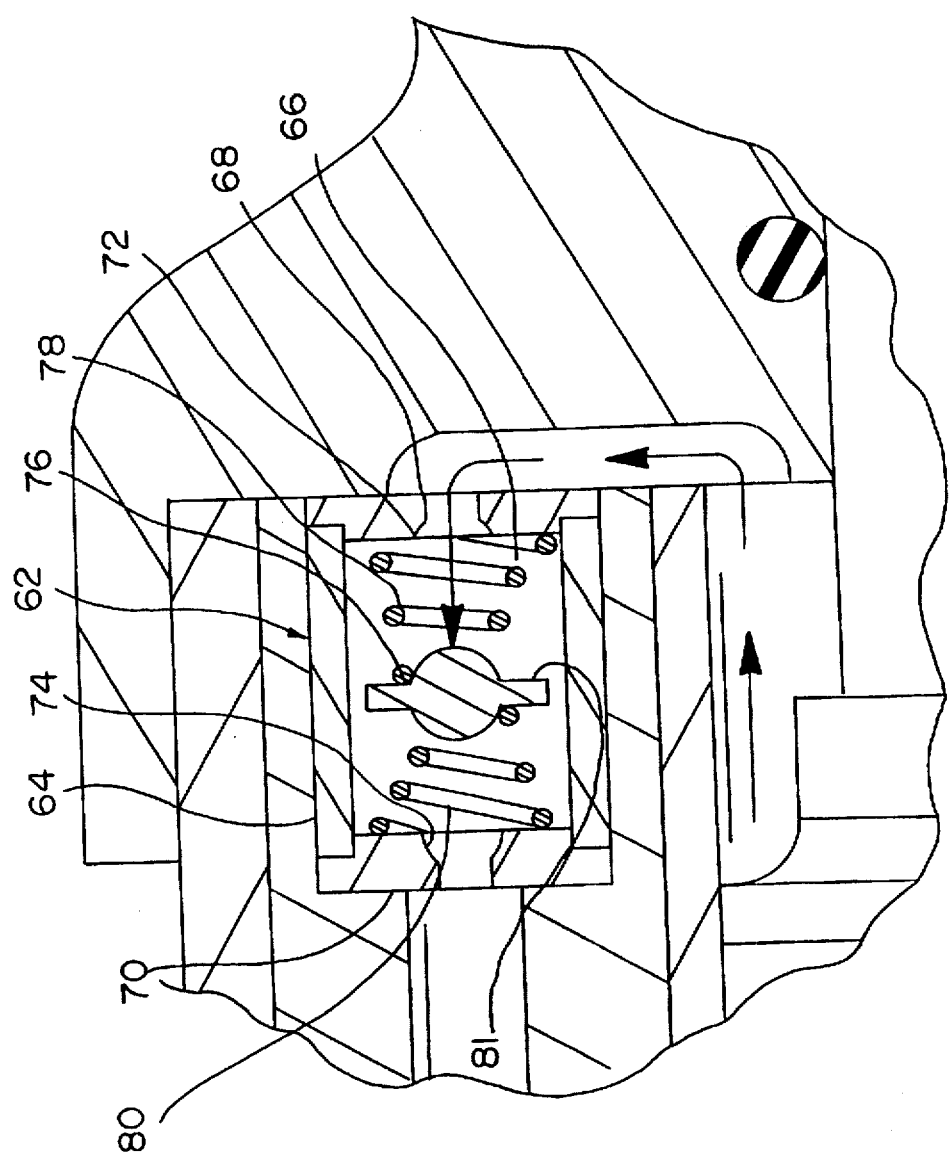
FIG. 5 is an enlarged view of the portion encircled at C in FIG. 3.

FIG. 3 and 5 show the opened position of the valve member 76 when no crash condition is sensed. Thus, when the valve 56 is opened, fluid may flow freely through the conduit 46 and between each chamber 48 and 50 of the cylinder 33. However, with reference to FIG. 4, when a crash condition occurs, the valve member 76 will move from its inoperative or opened position to an operative position in a seated relation with respect to one of the sealing surfaces 72 or 74. This occurs since the force of the impact or crash moves the piston 36. For example, as shown in FIG. 4, if the piston 36 is caused to move in the direction of arrow B due to a vehicle collision, fluid moves through bore 68 and moves the valve member 76 within the interior space 66 so as to extend spring 78 and compress spring 80. Thus, the valve member 76 moves to an operative position in sealing relation with sealing surface 74.

It can be appreciated that the valve member 76 is mounted for movement in two directions upon a crash condition so as to be in sealing relation with either sealing surface of the housing 64, depending upon the impact direction. In the illustrated embodiment, the springs 78 and 80 are of the decreasing spiral type and are connected to the valve member 76 and housing 64 so as to not interfere with the sealing function of the valve member 76 when compressed.

Thus, when the valve member 76 is in its operative, sealing position there is no fluid communication between the chambers 48 and 50, even if the valve 56 of the locking and release device 42 is in its releasing position. The seat cushion assembly 12 is thus in a hydraulically locked position.

It can be appreciated that the vehicle crash sensing system 42 may be of many different configurations. For example, as explained below but not shown, instead of providing the springs 78 and 80 and valve member 76, a spring steel diaphragm may be fixed within the interior space of the housing 64 at opposing ends of the housing 64. Each diaphragm includes a bore therethrough defined in a generally central portion thereof. Each bore communicates with the conduit 46. A valve member is fixed to the housing opposite each bore such that when a crash condition occurs, the central portion of one of the diaphragms will be forced by the fluid to move into sealing relation with the associated valve member to prevent communication between the chambers 48 and 50. Thus, in the manner discussed above, the cushion assembly which is mounted for movement may be hydraulically locked while the locking device is in a releasing position.

FIG. 2 shows a vehicle seat 100 depicting another application of the actuating mechanism 28 and vehicle crash sensing system 42 of the invention. Like parts are given like numerals. As shown, the seat back cushion assembly 14 is mounted via a mounting assembly, generally indicated at 130, so as to pivot with respect to the seat cushion assembly 12 via pivot 160. The mounting assembly 130 includes at least one bracket 15 fixed to the seat back cushion assembly 14. Bracket 15 is pivotally coupled to a frame 140 of the seat cushion assembly 12 at pivot 160.

In the illustrated embodiment, the adjusting mechanism 128 is coupled at one end thereof to the seat cushion assembly 12 via bracket 60. The eyelet 38 of the rod 34 of the adjusting mechanism 28 is pivotally coupled to one end of bracket 15 at pivot 142. As shown, the adjusting mechanism 28 is in a position permitting the seat back cushion assembly 14 to be in a generally upright position. To recline the seat back cushion assembly 14, the valve 56 is opened by moving the lever 58 as explained above, permitting communication between the chambers 48 and 50 of the cylinder 33. The seat back cushion assembly 14 may be moved by hand or by the passenger's back. Movement of the seat back cushion assembly 14 in direction of arrow D causes pivotal movement of the bracket 15 about the pivot point 160 and thus causes the rod 34 to move in the direction of arrow E.

It can be appreciated that the forward adjustment of the seat back cushion assembly 14 may take place automatically by use of a spring, when the valve 56 is opened. Thus, in the conventional manner, as disclosed for example in U.S. Pat. No. 3,533,658 (the disclosure of which is hereby incorporated into the present specification by reference), a resetting spring may be associated with the piston rod 34 to bias the seat back cushion assembly 14 forwardly. Alternatively, a tension spring may be coupled between the seat back mounting structure and a fixed portion of the vehicle seat 100 to bias the seat back cushion assembly forwardly.

The vehicle crash sensing system 62 of FIG. 2 works in a manner similar to that explained above with reference to FIG. 1. In that regard, if a crash condition occurs when the valve 56 is opened, the valve member 72 will move to an operative position preventing communication between the chambers 48 and 50 thereby providing a hydraulic lock of the vehicle seat back cushion assembly 14.

The viscosity of the fluid in housing 64 has an effect of the speed at which movement of the valve member 76 will occur. Consequently, since the valve member movement must overcome the resistance of spring 78 or 80 the effect of changes in viscosity due to temperature changes can be offset by using temperature sensitive springs. Thus, in the illustrated embodiment, the springs 78 and 80 are made of 55 NITINOL, a nickel-titanium alloy, to provide the offset. With such material, the colder the springs become, the stiffer the springs get to compensate for temperature changes of the fluid in housing 64.

It can be seen that the vehicle seat of the present invention provides an effective means of locking a movable portion of the seat in the event the seat is being adjusted while a collision occurs.

While the invention has been described in connection with what is presently considered to be the most practical and preferred embodiment, it is understood that the invention is not limited to the disclosed embodiment but, on the contrary, it is intended to cover various modification and equivalent arrangements within the spirit and scope of the appended claims.

What is claimed is:

1. A vehicle seat comprising:

a seat cushion assembly constructed and arranged to support an occupant seated thereon, a seat back cushion assembly constructed and arranged to support the back of an occupant seated on said seat cushion assembly, a first mounting assembly constructed and arranged to mount said seat cushion assembly on a vehicle floor assembly, a second mounting assembly constructed and arranged to mount said seat back cushion assembly on said seat cushion assembly, an adjusting mechanism operatively embodied in one of said first and second mounting assemblies constructed and arranged to enable the cushion assembly mounted by said one mounting assembly to be moved in opposite directions through a range of adjustable positions with respect to the assembly on which the one mounting assembly mounts the cushion assembly, said adjusting mechanism including an extensible and retractable unit constructed and arranged such that said extensible and retractable unit extends when said one cushion assembly mounted by said one mounting assembly is moved in one opposite direction and retracts which said one cushion assembly mounted by said one mounting assembly is moved in another opposite direction, said adjusting mechanism including a locking and releasing device constructed and arranged to be moved between (1) a locking position wherein said locking and releasing device is operable to lock said extensible and retractable unit to prevent movement in either direction of the cushion assembly enabled to be moved thereby and (2) a releasing position wherein the locking and releasing device is operable to release said extensible and retractable unit to permit the cushion assembly enabled to be moved thereby to be manually moved in relatively unrestricted fashion in one direction and returned in relatively unrestricted fashion in the opposite direction, and a vehicle crash sensing system operatively connected with said extensible and retractable unit constructed and arranged to provide control of the movement of the cushion assembly mounted by said one mounting assembly in response to the sensing of a crash condition which occurs while said locking device is in said releasing position.

2. The vehicle seat according to claim 1, wherein said first mounting assembly includes said adjusting mechanism, said first mounting assembly including a fixed frame portion and a movable frame portion, said fixed frame portion being constructed and arranged to be fixed to the vehicle floor assembly, said movable frame portion having the seat cushion assembly mounted thereon being mounted on said fixed frame portion for movement through said range of adjustable positions.

3. The vehicle seat according to claim 2, wherein said extensible and retractable unit includes:

- a hydraulic cylinder having fore and aft ends, said cylinder being mounted to one of said frame portions,
- a piston sealingly slidable in the cylinder and dividing said cylinder into a pair of chambers on opposite sides of said piston,
- a piston rod coupled to said piston and extending from each of the fore and aft ends of said cylinder, said rod having one end connected to the other of said frame portions, and
- a conduit fluidly connecting said chambers,
- said locking and release device including a valve in said conduit, said valve being constructed and arranged to be manually operated to be moved between said releasing position and said locking position such that when moved to said releasing position, said chambers are in fluid communication and when moved to said locking position, communication between said chambers is prevented which prevents said movable frame portion from moving relative to said fixed frame portion.

4. The vehicle seat according to claim 3, wherein said crash sensing system includes a valve member mounted with respect to said conduit, said valve member being movable in response to a crash condition which occurs while said locking device is in said releasing position from an inoperative position permitting communication between said chambers to an operative position preventing communication between said chambers.

5. The vehicle seat according to claim 4, wherein said crash sensing system comprises:

- a housing defining an interior space, said housing having bores through opposite ends thereof, each of said bores communicating said conduit with said interior space, said housing including sealing surfaces adjacent each of said bores, said valve member being mounted in said interior space of said housing, and
- spring structure coupling said valve member to said housing and biasing said valve member to its inoperative position, said valve member being constructed and arranged to move in response to a crash condition within said interior space to an operative position thereof in sealing relation with one of said sealing surfaces.

6. The vehicle seat according to claim 5, wherein the spring structure includes a pair of springs coupled to opposing ends of said valve member, each of said springs being a temperature sensitive spring constructed and arranged to change stiffness in response to changes in temperature such that the springs offset viscosity changes of the fluid in said housing due to changes in temperature of the fluid.

7. The vehicle seat according to claim 6, wherein each said spring is comprised of a nickel-titanium alloy.

8. The vehicle seat according to claim 1, wherein said first mounting assembly includes a frame and said second mounting assembly includes said adjusting mechanism, said second mounting structure having a bracket, said bracket being pivotally coupled to said frame.

9. The vehicle seat according to claim 8, wherein said extensible and retractable unit includes:

- a hydraulic cylinder having fore and aft ends, said cylinder being fixed to one of said frame and said bracket,
- a piston sealingly slidable in the cylinder and dividing said cylinder into a pair of chambers on opposite sides of said piston,
- a piston rod coupled to said piston and extending from each of the fore and aft ends of said cylinder, said rod having one end connected to the other of said frame and said bracket, and
- a conduit fluidly connecting said chambers,
- said locking and release device including a valve in said conduit, said valve being constructed and arranged to be manually operated to be moved between said releasing position and said locking position such that when moved to said releasing position, said chambers are in fluid communication and when moved to said locking position, communication between said chambers is prevented, thereby preventing movement of said bracket with respect to said frame.

10. The vehicle seat according to claim 9, wherein said crash sensing system comprises:

- a housing defining an interior space, said housing having bores through opposite ends thereof, each of said bores communicating said conduit with said interior space, said housing including a sealing surface associated with each of said bores, said valve member being mounted in said interior space of said housing, and
- spring structure coupling said valve member to said housing and biasing said valve member to its inoperative position, said valve member being constructed and arranged to move in response to a crash condition, which occurs while said locking device is in said releasing position, within said interior space to an operative position thereof in sealing relation with one of said sealing surfaces thereby preventing communication between said chambers.

11. The vehicle seat according to claim 9, wherein said crash sensing system includes a valve member mounted with respect to said conduit, said valve member being movable in response to a crash condition which occurs while said locking device is in said releasing position from an inoperative position permitting communication between said chambers to an operative position preventing communication between said chambers.

12. The vehicle seat according to claim 1, wherein said adjusting mechanism is constructed and arranged to enable the cushion assembly mounted by said one mounting assembly to be moved manually in opposite directions through a range of adjustable positions with respect to the assembly on which the one mounting assembly mounts the cushion assembly.

13. The vehicle seat according to claim 1, where said adjusting mechanism is constructed and arranged to enable the cushion assembly mounted by said one mounting assembly to be moved manually in one opposite direction through a range of adjustable positions with respect to the assembly on which the mounting assembly mounts the cushion assembly and to be moved by a spring in another opposite direction through a range of adjustable positions with respect to the assembly on which the mounting assembly mounts the cushion assembly.

* * * * *